(12) United States Patent
Tiesler et al.

(10) Patent No.: US 7,273,438 B2
(45) Date of Patent: Sep. 25, 2007

(54) AUTOMATIC TRANSMISSION

(75) Inventors: Peter Tiesler, Meckenbeuren (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 249 days.

(21) Appl. No.: 11/125,400

(22) Filed: May 6, 2005

(65) Prior Publication Data

US 2005/0255959 A1 Nov. 17, 2005

(30) Foreign Application Priority Data

May 14, 2004 (DE) .................. 10 2004 023 951

(51) Int. Cl.
 *F16H 3/44* (2006.01)
(52) U.S. Cl. ..................... 475/284; 475/290
(58) Field of Classification Search .............. 475/5, 475/275, 284, 285, 290, 291
See application file for complete search history.

(56) References Cited

U.S. PATENT DOCUMENTS

| | | |
|---|---|---|
| 4,395,925 A | 8/1983 | Gaus |
| 5,106,352 A | 4/1992 | Lepelletier |
| 5,295,924 A | 3/1994 | Beim |
| 5,342,257 A | 8/1994 | Hotta et al. |
| 5,435,792 A | 7/1995 | Justice et al. |
| 5,455,767 A | 10/1995 | Staerker |
| 5,514,050 A | 5/1996 | Bäuerle et al. |
| 5,913,746 A | 6/1999 | Bäuerle |
| 6,053,839 A | 4/2000 | Baldwin et al. |
| 6,083,135 A | 7/2000 | Baldwin et al. |
| 6,139,463 A | 10/2000 | Kasuya et al. |
| 6,217,474 B1 | 4/2001 | Ross et al. |
| 6,425,841 B1 | 7/2002 | Haka |
| 6,558,287 B2 | 5/2003 | Hayabuchi et al. |
| 6,572,507 B1 | 6/2003 | Korkmaz et al. |

(Continued)

FOREIGN PATENT DOCUMENTS

DE 29 36 969 A1 4/1981

(Continued)

OTHER PUBLICATIONS

Tenberge, Prof. Dr. P., "E-Automat Automatikgetriebe mit Esprit", *VDI-Berichte*, Nr. 1610, VDI Verlag GmbH-Düsseldorf, Germany, Jun. 20, 2001, pp. 455-479.

*Primary Examiner*—Roger Pang
(74) *Attorney, Agent, or Firm*—Davis Bujold & Daniels, P.L.L.C.

(57) ABSTRACT

A transmission with seven forward gears and one reverse gear comprising an input shaft, an output shaft, three planetary sets, seven rotatable shafts and six shifting elements. The input shaft is connected to the sun gear of the planetary set and can be connected to the fifth shaft, which is connected to the spider of the planetary set. The third shaft can be connected to the sixth shaft. The third shaft can be coupled to the housing and is connected to the spider of the first planetary set. The sixth shaft is connected to the internal gear of the second planetary set and the sun gear of the third planetary set and the seventh shaft is connected to the spider of the second planetary set. The fourth shaft is connected to the sun gear of the planetary set and the output shaft is connected to the internal gear of the planetary set.

18 Claims, 3 Drawing Sheets

U.S. PATENT DOCUMENTS

| | | |
|---|---|---|
| 6,634,980 B1 | 10/2003 | Ziemer |
| 6,723,018 B2 | 4/2004 | Hayabuchi et al. |
| 6,860,831 B2 | 3/2005 | Ziemer |
| 2003/0054917 A1 | 3/2003 | Raghavan et al. |
| 2003/0083174 A1 | 5/2003 | Tabata et al. |
| 2003/0203784 A1 | 10/2003 | Usoro et al. |
| 2004/0097324 A1 | 5/2004 | Ziemer |

FOREIGN PATENT DOCUMENTS

| | | |
|---|---|---|
| DE | 689 07 338 T2 | 11/1993 |
| DE | 691 16 480 T2 | 6/1996 |
| DE | 199 12 480 A1 | 9/2000 |
| DE | 199 49 507 A1 | 4/2001 |
| DE | 100 43 751 A1 | 6/2001 |
| DE | 102 00 379 A1 | 8/2002 |
| DE | 101 15 983 A1 | 10/2002 |
| DE | 101 15 987 A1 | 10/2002 |
| DE | 102 13 820 A1 | 10/2002 |
| DE | 102 50 374 A1 | 6/2003 |
| DE | 102 31 350 A1 | 1/2004 |
| EP | 0 434 525 A1 | 6/1991 |
| EP | 0 378 900 B1 | 6/1993 |
| EP | 1 411 269 A2 | 4/2004 |
| GB | 1 522 616 | 8/1978 |
| JP | 04119245 A | 4/1992 |
| JP | 2000234664 | 8/2000 |
| JP | 2000291747 A | 10/2000 |
| JP | 2001082555 A | 3/2001 |
| JP | 2002323098 A | 11/2002 |
| WO | WO-02/079670 A2 | 10/2002 |
| WO | WO-02/079671 A2 | 10/2002 |
| WO | WO 03/095865 A1 | 11/2003 |

| | B03 | B04 | B05 | K15 | K35 | K36 | i | φ |
|---|---|---|---|---|---|---|---|---|
| 1 | | ● | ● | | ● | | 4.65 | |
| 2 | | ● | | | ● | ● | 2.67 | 1.74 |
| 3 | | ● | | ● | ● | | 1.56 | 1.71 |
| 4 | | | | ● | ● | ● | 1.00 | 1.56 |
| 5 | | ● | | ● | | ● | 0.73 | 1.38 |
| 6 | ● | | | ● | | ● | 0.62 | 1.16 |
| 7 | ● | ● | | ● | | | 0.55 | 1.13 |
| R1 | | ● | ● | | | ● | -4.41 | 0.95 |

AUTOMATIC TRANSMISSION

This application claims priority from German Application Serial No. 10 2004 023951.7 filed May 14, 2004.

FIELD OF THE INVENTION

The present invention relates to a multi-speed transmission of planetary construction, especially an automatic transmission for a motor vehicle.

BACKGROUND OF THE INVENTION

According to the state of the art, automatic transmission, especially for motor vehicles, include planetary sets, which are shifted by way of friction or shifting elements, such as clutches and brakes, and are generally connected to a starting element which is subject to slip action and is optionally equipped with a bypass clutch, such as a hydrodynamic torque converter or a fluid clutch.

Such a transmission is disclosed in EP 0 434 525 A1. It essentially comprises an input shaft and an output shaft, which are arranged parallel to each other; a double planetary gear set arranged concentric with the output shaft and five shifting elements in the form of three clutches and two brakes, the selective lockup of which determines, in pairs, the various gear ratios between the input shaft and the output shaft. The transmission comprises a front-mounted gear set and two power paths so that six forward gears can be achieved by selectively engaging the five shifting elements in pairs.

With the first power path, two clutches are required for the transmission of torque from the front-mounted gear set to two elements of the double planetary gear set. These are arranged in the direction of power flow essentially behind the front-mounted gear set in the direction of the double planetary gear set. With the second power path, another clutch is provided, which connects it detachably to another element of the double planetary gear set. The clutches are arranged such that the inside multi-disk carrier forms the output.

Furthermore, a compact multi-speed transmission of planetary construction, especially for a motor vehicle, is known from U.S. Pat. No. 6,139,463, which comprises two planetary gear sets and one front-mounted gear set as well as three clutches and two brakes. In this familiar multi-speed transmission, two clutches C-1 and C-3 are provided in a first power path for transmitting torque from the front-mounted gear set to the two planetary gear sets. Here the outside multi-disk carrier and/or the cylinder or piston and pressure compensating side of the clutch C-3 is connected to a first brake B-1. Additionally, the inside multi-disk carrier of the third clutch C-3 is connected to the cylinder or piston and pressure compensating side of the first clutch C-1, wherein the inside multi-disk carrier of the first clutch C-1 is arranged on the output side and connected to a sun gear of the third planetary gear set.

Moreover, a multi-speed transmission is known from DE 199 49 507 A1 in which two non-shiftable input-side gear sets are provided, which generate two rotational speeds on the output side which, apart from the rotational speed of the input shaft, optionally can be shifted to a shiftable double planetary gear set acting upon the output shaft by selectively engaging the shifting elements that are used in such a way that for shifting from gear to the next higher or lower gear of the two just actuated shifting elements, only one shifting element has to be activated or deactivated.

From DE 199 12 480 A1, an automatically shiftable motor vehicle transmission is known comprising three single-spider planetary sets as well as three brakes and two clutches for shifting six forward gears and one reverse gear and comprising one input and one output shaft. The automatically shiftable motor vehicle transmission is designed such that the input shaft is connected directly to the sun gear of the second planetary set and that the input shaft can be connected to the sun gear of the first planetary set via the first clutch and/or to the spider of the first planetary set via the second clutch. Additionally or alternatively, the sun gear of the first planetary set can be connected to the housing of the transmission via the first brake and/or the spider of the first planetary set to the housing via the second brake and/or the sun gear of the third planetary set to the housing via the third brake.

Furthermore, a multi-speed automatic transmission is known from DE 102 13 820 A1, comprising a first input path T1 of a first gear ratio; an input path T2, which has a larger gear ratio than input path T1; a planetary gear set with four elements, wherein the four elements are a first element, a second element, a third element and a fourth element in the sequence of the elements in a speed diagram; a clutch C-2, which transmits a rotation of the input path T2 to the first element S3; a clutch C-1, which transmits the rotation of the input path T2 to the fourth element S2; a clutch C-4, which transmits a rotation from the input path T1 to the first element; a clutch C-3, which transmits the rotation from the input path T1 to the second element C3; a brake B-1, which establishes the engagement of the fourth element; a brake B-2, which establishes the engagement of the second element, and an output element, which is coupled to the third element R3.

A multi-speed transmission is described within the framework of DE 101 15 983 A1 by the Applicant comprising an input shaft, which is connected to a front-mounted set; an output shaft, which is connected to a rear-mounted set, and with no more than seven shifting elements, whose selective shifting allows at least seven forward gears to be shifted without a range shift. The front-mounted set is formed by a front-mounted planetary gear set or no more than two non-shiftable front-mounted planetary gear sets that are coupled to the first front-mounted planetary gear set, wherein the rear-mounted set is designed as a two-spider, four-shaft gear with two shiftable, rear-mounted planetary gear sets and comprises four free shafts. The first free shaft of two-spider, four-shaft gear is connected to the first shifting element; the second free shaft to the second and third shifting elements; the third free shaft to the fourth and fifth shifting elements, and the fourth free shaft is connected to the output shaft. For a multi-speed transmission with a total of six shifting elements, according to the invention it is suggested to connect the third free shaft or the first free shaft of the rear-mounted set additionally to a sixth shifting element. For a multi-speed transmission with a total of seven shifting elements according to the invention it is suggested to connect the third free shaft additionally to a sixth shifting element D' and the first free shaft additionally to a seventh shifting element.

Furthermore, within the framework of DE 10115 987 by the Applicant, a multi-speed transmission with at least seven gears is described. This transmission consists, apart from the input shaft and the output shaft, also of a non-shiftable, front-mounted gear set and a shiftable rear-mounted gear set in the form of a two-spider, four-shaft transmission. The front-mounted gear set consists of a first planetary gear set, which (apart from the input rotational speed of the input shaft) offers a second rotational speed, which can be optionally actuated on the rear-mounted gear set. The rear-mounted gear set consists of two shiftable, planetary gear sets, which can shift at least seven gears using the six shifting elements, thus forming two power paths. In doing so, during each shifting operation beneficially always range shifts are avoided. A 9-gear multi-speed transmission is furthermore known from DE 29 36 969; it comprises eight shifting elements and four gear sets.

Automatically shiftable motor vehicle transmissions of planetary construction have, in general, been described numerous times in the prior art and are subject to permanent development and improvement. These transmissions reportedly have a sufficient number of forward gears as well as a reverse gear and a well-suited gear ratio for motor vehicles with a high overall gear ratio spread as well as favorable progressive ratios. Furthermore, they are intended to enable a high starting gear ratio in the forward direction and contain a direct gear, and they are supposed to be suited for use both in passenger vehicles and commercial vehicles. Moreover, these transmissions reportedly require little construction expenditure. In particular, they require a small number of shifting elements, and reportedly avoid double-shifting during sequential shifting so that only one shifting element is changed when shifting in defined gear groups.

It is the object of the present invention to suggest a multi-speed transmission of the above-described kind, in which the construction effort is optimized and, additionally, the efficiency in the main travel gears is improved in terms of drag and gearing losses. Furthermore, with the multi-speed transmission of the invention, low torque is intended to act upon the shifting elements and planetary sets and also the rotational speeds of the shafts, shifting elements and planetary sets are supposed to be kept as low as possible. Furthermore the number of gears as well as the spread of gear ratios is supposed to be increased so that beneficially seven forward gears and at least one reverse gear can be implemented. Moreover the transmission of the invention is supposed to be suited for any vehicle design, especially for a front-transverse arrangement.

This object is achieved pursuant to the invention by the features of patent claim 1. Further benefits and beneficial embodiments are revealed in the dependent claims.

SUMMARY OF THE INVENTION

According to the invention, a multi-speed transmission of planetary construction is suggested, which comprises an input shaft and an output shaft, which are arranged in a housing. Moreover at least three planetary gears, at least seven rotatable shafts as well as at least six shifting elements, comprising brakes and clutches, are provided, the selective engagement of which results in various gear ratios between the input shaft and the output shaft, so that preferably seven forward gears and at least one reverse gear can be realized.

In doing so, the input shaft is permanently connected to the sun gear of the second planetary set and can be connected via a clutch to a first shaft, which is connected to the spider of the third planetary set, can be coupled to the housing and detachably connected via a clutch to a second shaft, wherein the second shaft can be detachably connected via a clutch to a third shaft, can be coupled via a brake to the housing and is permanently connected to the spider of the first planet set. According to the invention, the third shaft is permanently connected to the internal gear of the second planetary gear and to the sun gear of the third planetary set, wherein a fourth shaft is permanently connected to the spider of the second planetary set and the internal gear of the first planetary set, and wherein a fifth shaft is permanently connected to the sun gear of the first planetary set and can be coupled to the housing; according to the invention, the output shaft is permanently connected to the internal gear of the third planetary set.

The design of the multi-speed transmission, according to the invention, results in suitable gear ratios, particularly for passenger vehicles, as well as a significant increase in the overall gear ratio spread of the multi-speed transmission, thus leading to an improvement in the driving comfort and a significant decrease in fuel consumption.

Beyond that, the construction expenditure is reduced significantly through the multi-speed transmission of the invention due to the low number of shifting elements; preferably three brakes and three clutches. Beneficially it is possible with the inventive multi-speed transmission to perform a starting motion with a hydrodynamic converter, an external starting clutch or also with other suitable external starting elements. It is also conceivable to enable a starting process with a starting element that is integrated in the transmission. Preferably a shifting element is suited, which is actuated in the first forward gear and in the reverse gear.

Beyond that, the multi-speed transmission of the invention results in good efficiency in the main travel gears in terms of drag and gearing losses.

Furthermore, low torque exists in the shifting elements and in the planetary sets of the multi-speed transmission, thus beneficially reducing wear in the multi-speed transmission. Furthermore, the low torque enables correspondingly small dimensioning, thus reducing the required space and corresponding costs. Above and beyond this, low rotational speeds are also present on the shafts, the shifting elements and the planetary sets.

Moreover, according to the invention, the transmission is designed such that it can be adapted to different drive train embodiments, both in the power flow direction and also from a spatial point of view.

BRIEF DESCRIPTION OF THE DRAWINGS

The invention will now be described, by way of example, with reference to the accompanying drawings in which.

DETAILED DESCRIPTION OF THE INVENTION

Figures 1, 2:
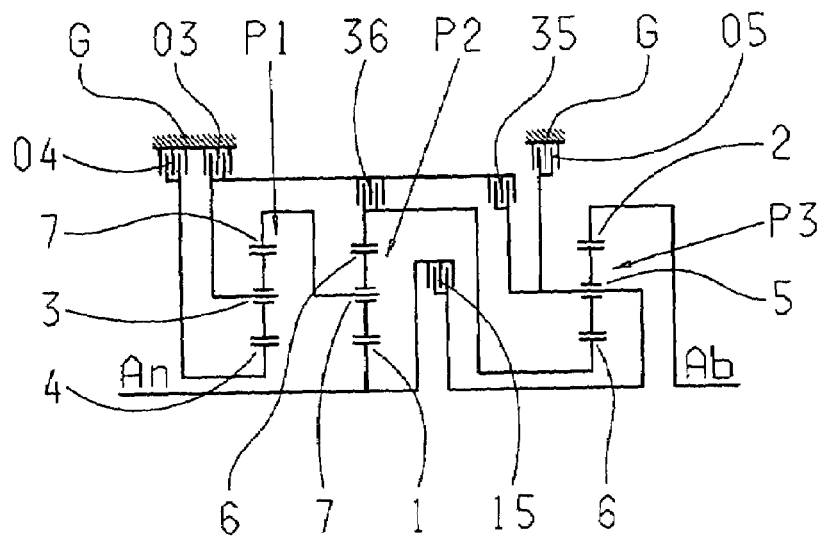
FIG. 1 represents a diagrammatic view of a preferred embodiment of a multi-speed transmission of the invention.
FIG. 2 represents an exemplary gear shift pattern for the multi-speed transmission of the invention from FIG. 1.

FIG. 1 shows a multi-speed transmission, according to the invention, comprising an input shaft 1 (An) and an output shaft 2 (Ab), which are arranged in a housing G. Three planetary sets P1, P2, P3 are provided, which are preferably designed as minus planetary sets.

As shown in FIG. 1, only six shifting elements, namely three brakes 03, 04, 05 and three clutches 15, 35, 36, are provided.

Using these shifting elements, selective shifting of seven forward gears and one reverse gear can be implemented. According to the invention, the multi-speed transmission has a total of seven rotatable shafts, namely the shafts 1, 2, 3, 4, 5, 6 and 7.

According to the invention, it is provided in the multi-speed transmission from FIG. 1 that the input occurs by way of the shaft 1, which is permanently connected to the sun gear of the second planetary set P2 and can be connected via a clutch 15 to the shaft 5, which is connected to the spider of the third planetary set P3, can be coupled via the brake 05 to the housing and can be detachably connected via the clutch 35 to the shaft 3. According to the invention, the shaft 3 can be detachably connected via the clutch 36 to the shaft 6, can be coupled via the brake 03 to the housing G and is permanently connected to the spider of the first planetary set P1. Furthermore, the shaft 6 is permanently connected to the internal gear of the second planetary set P2 and to the sun gear of the third planetary set P3. As the Figure shows, the shaft 7 is permanently connected to the spider of the second planetary set P2 and the internal gear of the first planetary set P1, wherein the shaft 4 is permanently connected to the sun gear of the first planetary set P1 and can be coupled via the brake 04 to the housing G. The output occurs via the shaft 2, which is permanently connected to the internal gear of the third planetary set P3.

The spatial arrangement of the shifting elements can be random and is only limited by the dimensions and the outer shape.

FIG. 2 illustrates an exemplary shift pattern of the inventive multispeed transmission from FIG. 1. For each gear, three shifting elements are engaged. The shift pattern, by way of example, reveals respective gear ratios i of the individual gear steps and the resulting progressive ratios φ. Besides, the shift pattern shows that with a sequential shifting operation double-shifting and/or range shifts are avoided since two adjoining gear steps jointly use two shifting elements. The fourth gear is preferably designed as a direct gear, wherein the progressive ratios are small in the higher gears.

The first gear results from the engagement of the brakes 04 and 05 and the clutch 35; the second gear from the engagement of the brake 04 and the clutches 35 and 36, and the third gear from the engagement of the brake 04 and the clutches 15 and 35. Moreover, the fourth gear results from the engagement of the clutches 15, 35 and 36; the fifth gear by the engagement of the brake 04 and the clutches 15 and 36; the sixth gear from the engagement of the brake 03 and the clutches 15 and 36, and the seventh gear from the engagement of the brakes 03 and 04 and the clutch 36. As the shift pattern illustrates, the reverse gear results from the engagement of the brakes 04 and 05 and the clutch 36.

According to the invention, starting is possible with integrated shifting elements (IAK). Here especially a shifting element, that is required in the first gear and in the reverse gear without reversal of the direction of rotation, is suitable.

According to the invention, different gear ratio steps can result from the same gear shift pattern, depending on the shifting logic, so that an application and/or vehicle specific variation is enabled.

Additionally, it is possible to provide further free wheels in any suitable area of the multispeed transmission, for example between a shaft and the housing or, if necessary, to connect two shafts.

Figure 3:
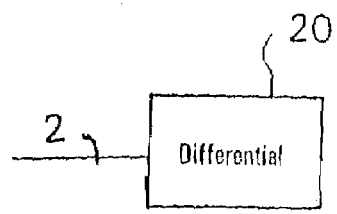
FIG. 3 is a diagrammatic view of an embodiment of the inventive multi-speed transmission having a differential.

On the input side or on the output side, according to the invention as shown in FIG. 3, an axle differential and/or a central differential 20 can be arranged.

Figure 4:
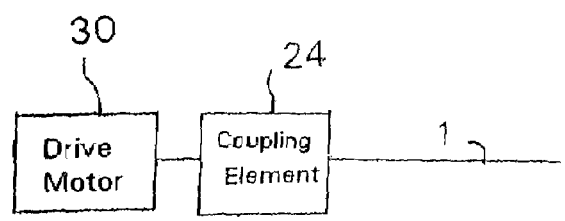
FIG. 4 is a diagrammatic view of an embodiment of the inventive multi-speed transmission with a coupling element and a drive motor.
Figure 5:
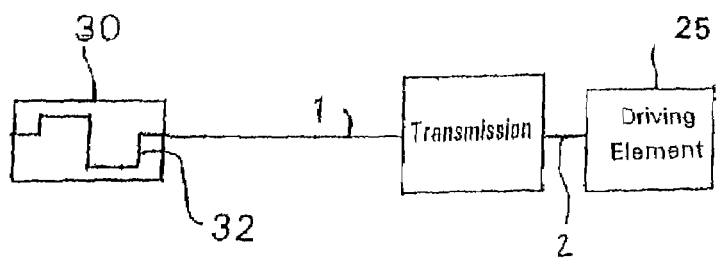
FIG. 5 is a diagrammatic view of another embodiment of the inventive multi-speed transmission with the crankshaft of the drive motor fixed to the input shaft of the multi-speed transmission and the coupling element located behind the multi-speed transmission.

Within the framework of a beneficial further development, the input shaft 1 can be separated, as needed, from the driving motor 30 by way of a clutch or coupling element 24, as shown in FIG. 4, wherein as the clutch element, a hydrodynamic converter, a hydraulic clutch, a dry starting clutch, a wet starting clutch, a magnetic powder clutch or a centrifugal clutch can be used. It is also feasible to arrange such a starting or driving element 25 in the power flow direction behind the transmission, as shown in FIG. 5, wherein, in this case, the input shaft 1 is permanently connected to the crankshaft 32 of the motor 30.

Figure 6:
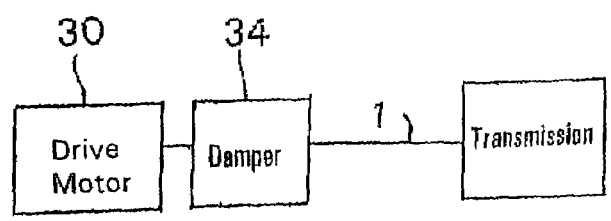
FIG. 6 is a diagrammatic view of an embodiment of the inventive multi-speed transmission having the drive motor communicating with a damper.

The multispeed transmission, according to the invention, moreover enables the arrangement of a torsional vibration damper 34 between the motor 30 and transmission, as shown in FIG. 6.

Figure 7:
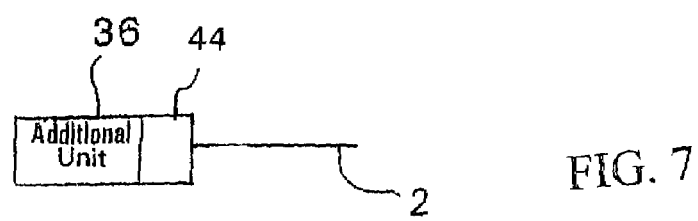
FIG. 7 is a diagrammatic view of an embodiment of the inventive multi-speed transmission with a power take-off for driving an additional unit.
Figure 9:
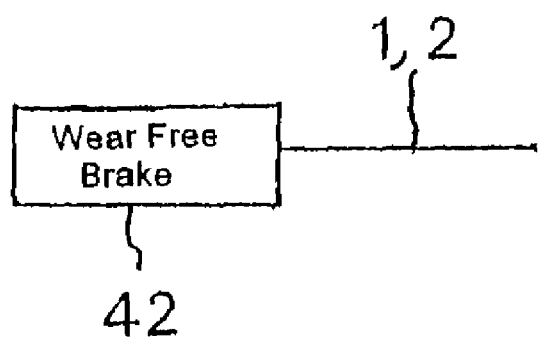
FIG. 9 is a diagrammatic view of the inventive multi-speed transmission having a wear free brake.

Within the framework of another embodiment of the invention on each shaft, preferably on the input shaft 1 or the output shaft 2, a wear-free brake 42, e.g., a hydraulic or electric retarder or the like, can be arranged as shown in FIG. 9, which is especially significant for the use in commercial vehicles. Moreover, in order to drive an additional assembly or assemblies 36 on each shaft, preferably on the input shaft 1 or the output shaft 2, as shown in FIG. 7 for example, a power take-off 44 can be provided.

The employed shifting elements can be designed as power-shift clutches or brakes. Especially non-positive clutches or brakes, such as multi-disk clutches, band brakes and/or cone clutches, can be used. Moreover, positive brakes and/or clutches, such as synchronizing mechanisms or claw couplings, also can be used as shifting elements.

Figure 8:
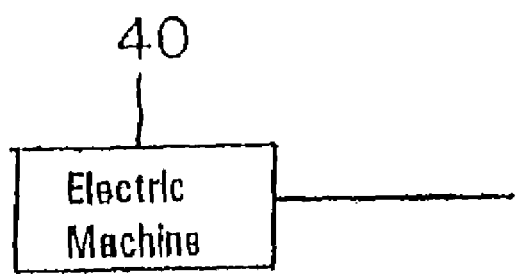
FIG. 8 is a diagrammatic view of an embodiment of the inventive multi-speed transmission with an electric machine.
Figure 10:
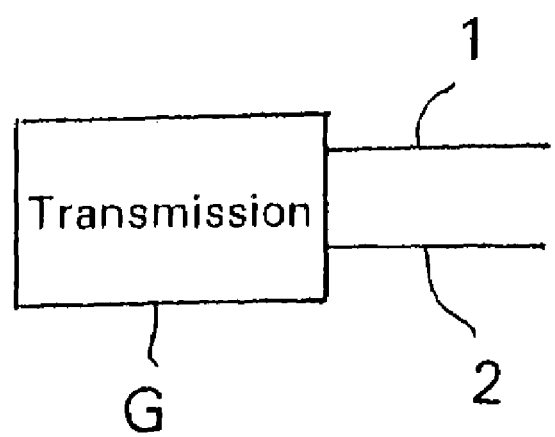
FIG. 10 is a diagrammatic view of a further embodiment of the invention with the input and the output being provided on the same side of the multi-speed transmission housing.

Another benefit of the multistage transmission presented here is that on each shaft an electric unit or machine 40 can be attached as a generator and/or as an additional driving unit, as shown in FIG. 8. As shown in FIG. 10, the input and the output are provided on the same side of the housing of the transmission G.

Of course also any design embodiment, especially any spatial configuration of the planetary sets and the shifting elements as such and in relation to each other and to the extent it is technically useful, is covered by the scope of protection of the present claims without influencing the function of the transmission as provided in the claims, even if these embodiments are not explicitly illustrated in the Figures or in the description.

Reference Numerals
1 shaft
2 shaft
3 shaft
4 shaft
5 shaft
6 shaft
7 shaft
03 brake
04 brake
05 brake
15 clutch
35 clutch
36 clutch
P1 planetary Set
P2 planetary Set
P3 planetary Set
An input
Ab output
  i gear ratio
  φ progression
  G housing

The invention claimed is:

1. A multi-speed transmission of a planetary construction for an automatic transmission for a motor vehicle, the transmission comprising:

an input shaft (1) and an output shaft (2) which are arranged in a housing (G), first, second and third planetary gear sets (P1, P2, P3), at least seven rotatable shafts (1, 2, 3, 4, 5, 6, 7) as well as at least six shifting elements (03, 04, 05, 15, 35, 36) comprising a first brake (03), a second brake (04) and a third brake (05) and a first clutch (15), a second clutch (35) and a third clutch (36) whose selective engagement results in various gear ratios between the input shaft (1) and the output shaft (2) so that seven forward gears and one reverse gear can be implemented, the input shaft (1) is permanently connected to a sun gear of the second planetary gear set (P2) and can be connected, via the first clutch (15), to a fifth shaft (5) which is connected to a spider of the third planetary gear set (P3), the fifth shaft (5) can be coupled, via the third brake (05), to the housing (G) and can be detachably connected, via the second clutch (35), to a third shaft (3), the third shaft (3) can be detachably connected, via the third clutch (36), to a sixth shaft (6), the third shaft (3) can be coupled, via the first brake (03), to the housing (G) and is permanently connected to a spider of the first planetary gear set (P1), the sixth shaft (6) is permanently connected to an internal gear of the second planetary gear set (P2) and a sun gear of the third planetary gear set (P3), and a seventh shaft (7) is permanently connected to a planet carrier of the second planetary gear set (P2) and an internal gear of the first planetary gear set (P1), a fourth shaft (4) is permanently connected to a sun gear of the first planetary gear set (P1) and can be coupled, via the second brake (04), to the housing (G), and the output shaft (2) is permanently connected to an internal gear of the third planetary gear set (P3).

2. The multi-speed transmission according to claim 1, wherein the three planetary gear sets (P1, P2, P3) are minus planetary gear sets.

3. The multi-speed transmission according to claim 1, wherein first gear results from engagement of the second and the third brakes (04, 05) and the second clutch (35), second gear results from engagement of the second brake (04) and the second and the third clutches (35, 36), third gear results from engagement of the second brake (04) and the first and the second clutches (15, 35), fourth gear results from engagement of the first, the second and the third clutches (15, 35, 36), fifth gear from engagement of the second brake (04) and the first and the third clutches (15, 36), sixth gear results from engagement of the first brake (03) and the first and the third clutches (15, 36), and seventh gear results from engagement of the first and the second brakes (03, 04) and the first clutch (15).

4. The multi-speed transmission according to claim 1, wherein the reverse gear results from engagement of the second and the third brakes (04, 05) and the third clutch (36).

5. The multi-speed transmission according to claim 1, wherein an input and an output of the transmission are provided on a same side of the housing.

6. The multi-speed transmission according to claim 1, wherein one of an axle and a central differential is arranged on an input side or an output side of the transmission.

7. The multi-speed transmission according to claim 1, wherein a coupling element separates the input shaft (1) from a drive motor.

8. The multi-speed transmission according to claim 7, wherein the coupling element is one of a hydrodynamic converter, a hydraulic clutch, a dry starting clutch, a wet starting clutch, a magnetic powder clutch and a centrifugal clutch.

9. The multi-speed transmission according to claim 8, wherein the drive element is arranged in a power flow direction behind the transmission, and the input shaft (1) is firmly connected to a crankshaft of the driving motor.

10. The multi-speed transmission according to claim 1, wherein starting occurs via one of the at least six shifting elements of the transmission, and the input shaft (1) is permanently connected to a crankshaft of a motor.

11. The multi-speed transmission according to claim 1, wherein a torsional vibration damper is arranged between the motor and the transmission.

12. The multi-speed transmission according to claim 1, wherein a wear-free brake is arranged on at least one of the seven rotatable shafts.

13. The multi-speed transmission according to claim 1, wherein a power take-off is arranged on at least one of the seven rotatable shafts for driving an additional unit.

14. The multi-speed transmission according to claim 13, wherein the power take-off is arranged on one of the input shaft (1) or the output shaft (2).

15. The multi-speed transmission according to claim 1, wherein the at least six shifting elements are one of power-shift clutches or brakes.

16. The multi-speed transmission according to claim 15, wherein at least one of multi-disk clutches, band brakes and cone clutches is used as one of the power-shift clutches or brakes.

17. The multi-speed transmission according to claim 1, wherein the shifting elements are at least one of positive brakes and clutches.

18. The multi-speed transmission according to claim 1, wherein an electric unit is attached on at least one of the at least seven rotatable shafts as at least one of a generator and an additional driving unit.

* * * * *